United States Patent [19]

Sigler

[11] Patent Number: 5,345,337
[45] Date of Patent: Sep. 6, 1994

[54] VISCOUS SUPERCOOLED LIQUID LENS ELEMENTS HAVING ABNORMAL DISPERSION

[75] Inventor: Robert D. Sigler, Cupertino, Calif.

[73] Assignee: Lockheed Missiles & Space Company, Inc., Sunnyvale, Calif.

[21] Appl. No.: 10,048

[22] Filed: Jan. 28, 1993

[51] Int. Cl.⁵ ............................ G02B 3/12; G02B 1/06
[52] U.S. Cl. .................................... 359/665; 359/796
[58] Field of Search ............... 359/665; 372/101, 99

[56] References Cited

U.S. PATENT DOCUMENTS

| | | | |
|---|---|---|---|
| 4,526,711 | 7/1985 | Sacher et al. | 359/665 |
| 4,911,538 | 3/1990 | Robb | 359/665 |
| 4,913,535 | 4/1990 | Robb | 359/665 |
| 4,915,483 | 4/1990 | Robb | 359/665 |
| 4,932,762 | 6/1990 | Robb | 359/665 |
| 4,950,041 | 8/1990 | Robb | 359/665 |
| 4,958,919 | 9/1990 | Sigler | 359/665 |
| 4,996,448 | 10/1990 | Robb | 359/665 |
| 5,033,831 | 7/1991 | Sigler | 359/665 |

Primary Examiner—Edward L. Look
Assistant Examiner—Michael S. Lee
Attorney, Agent, or Firm—John J. Morrissey

[57] ABSTRACT

Optimized design forms are provided for glass-liquid lens triplets for use as telescope objectives having reduced secondary spectrum. Each lens triplet comprises an abnormal-dispersion liquid lens element contained between two normal-dispersion glass lens elements. The glass lens elements are made of readily available and relatively inexpensive optical glasses. The liquid lens element in each lens triplet consists of a commercially available viscous supercooled liquid of abnormal dispersion, which is transparent to optical radiation at visible wavelengths without freezing at temperatures in a range from about −50° C. to about 50° C.

13 Claims, 9 Drawing Sheets

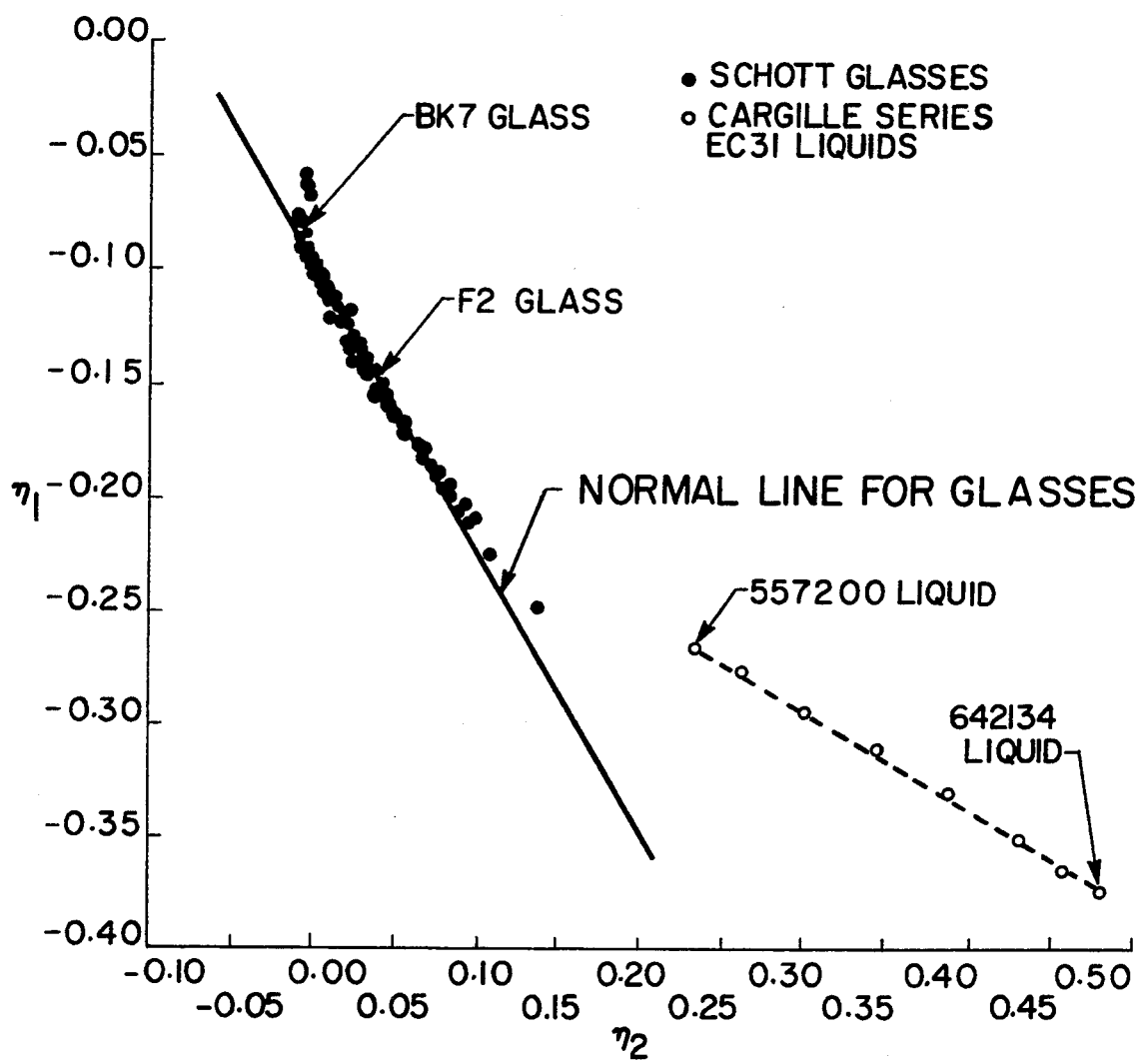

FIG_2
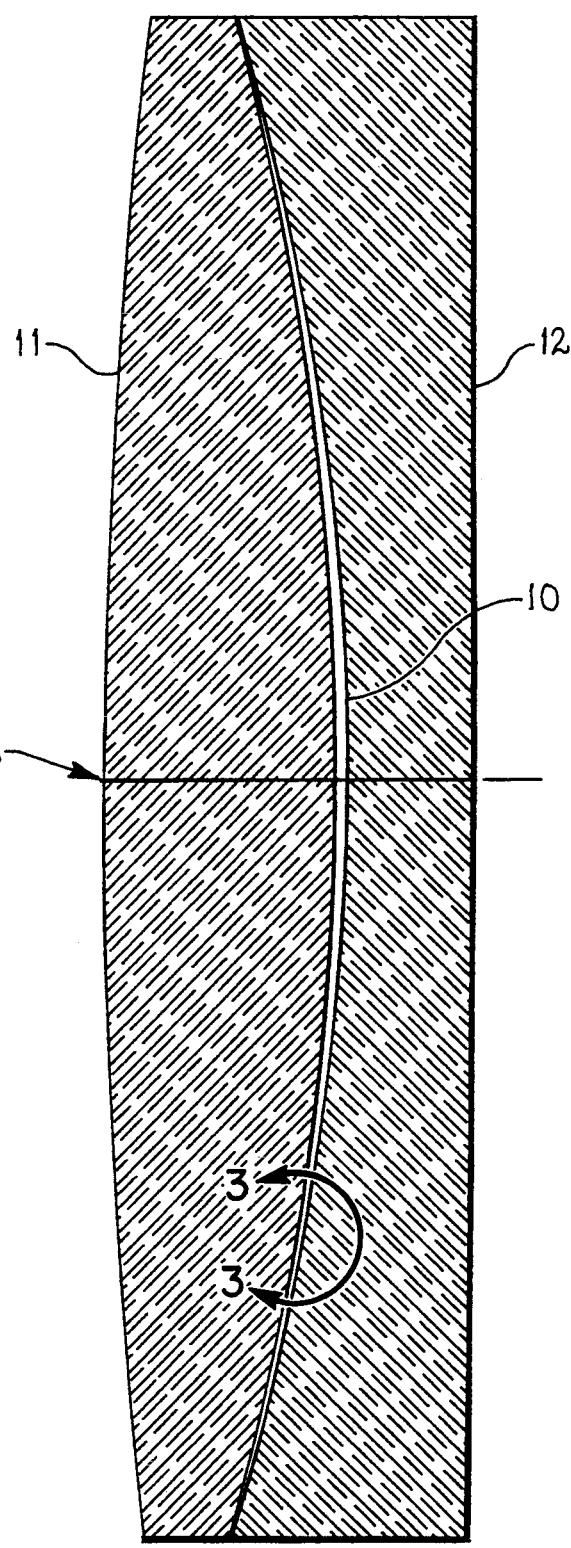
OPTIC AXIS
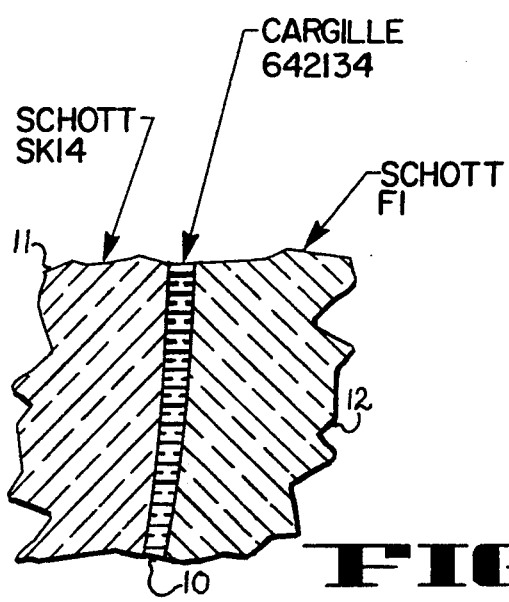
FIG_3

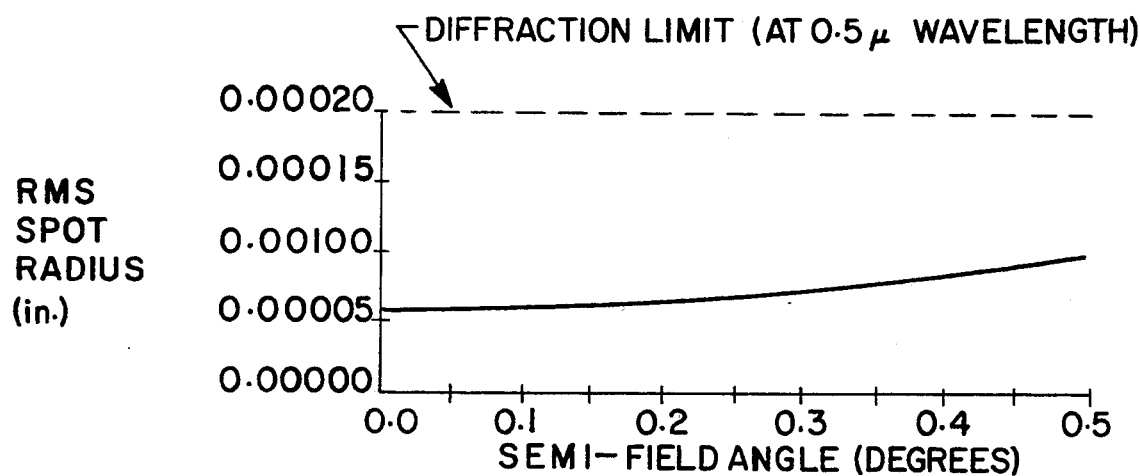
FIG_4
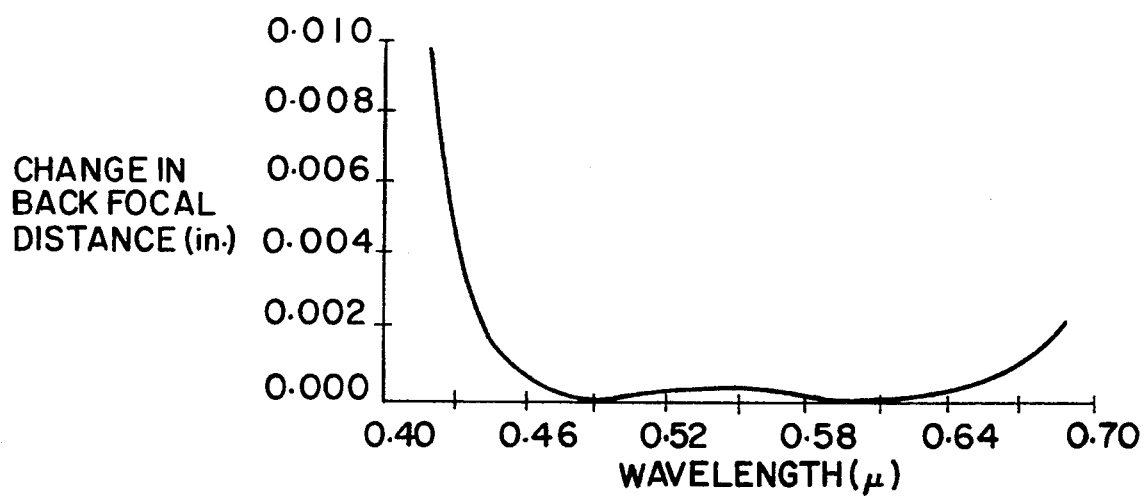
FIG_5

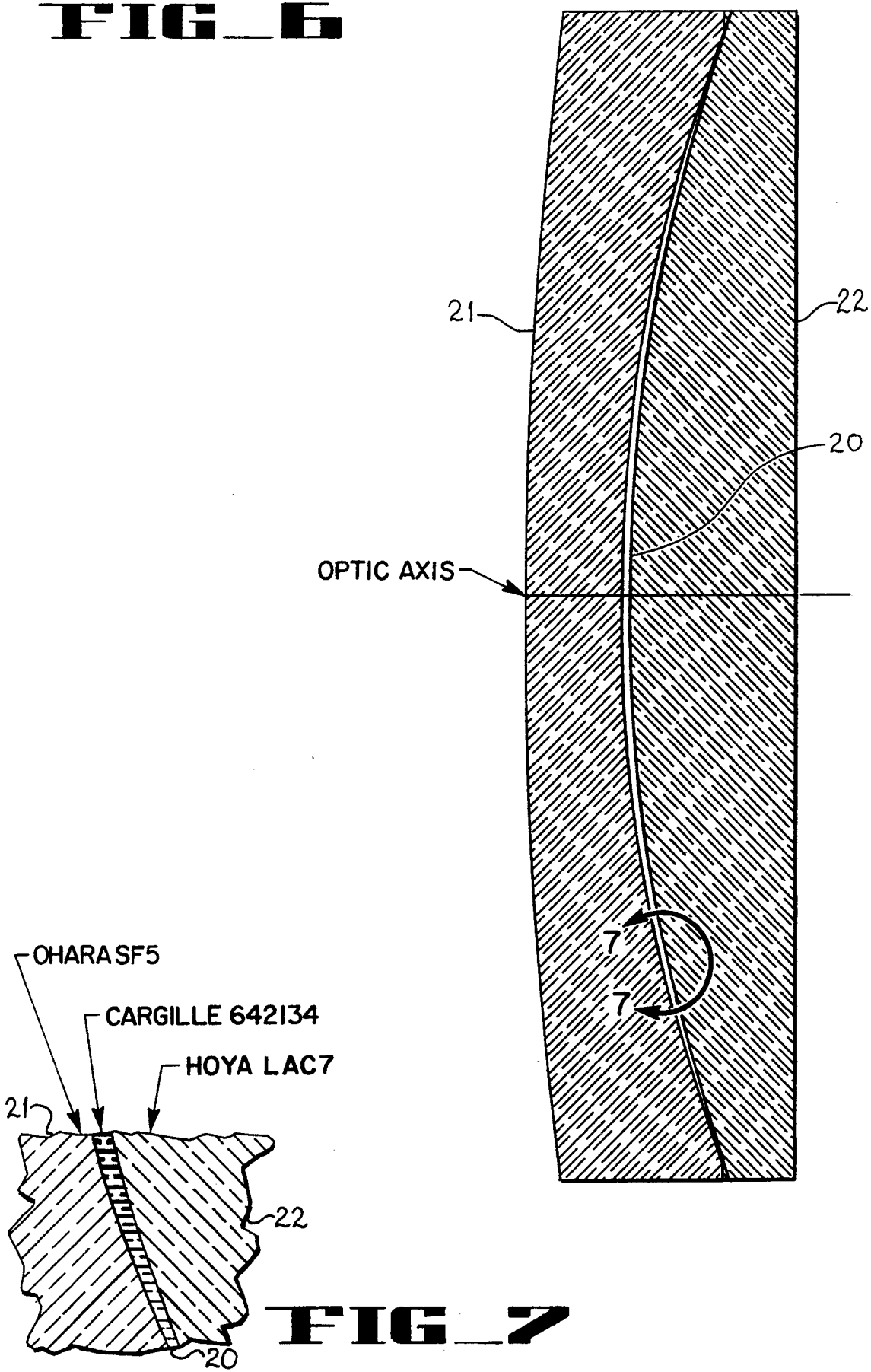

FIG_8
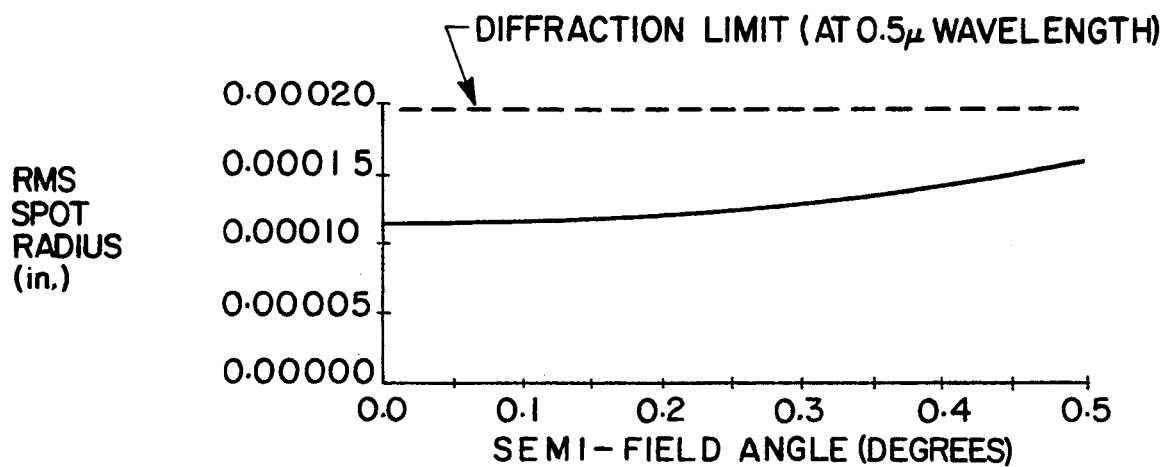
FIG_9
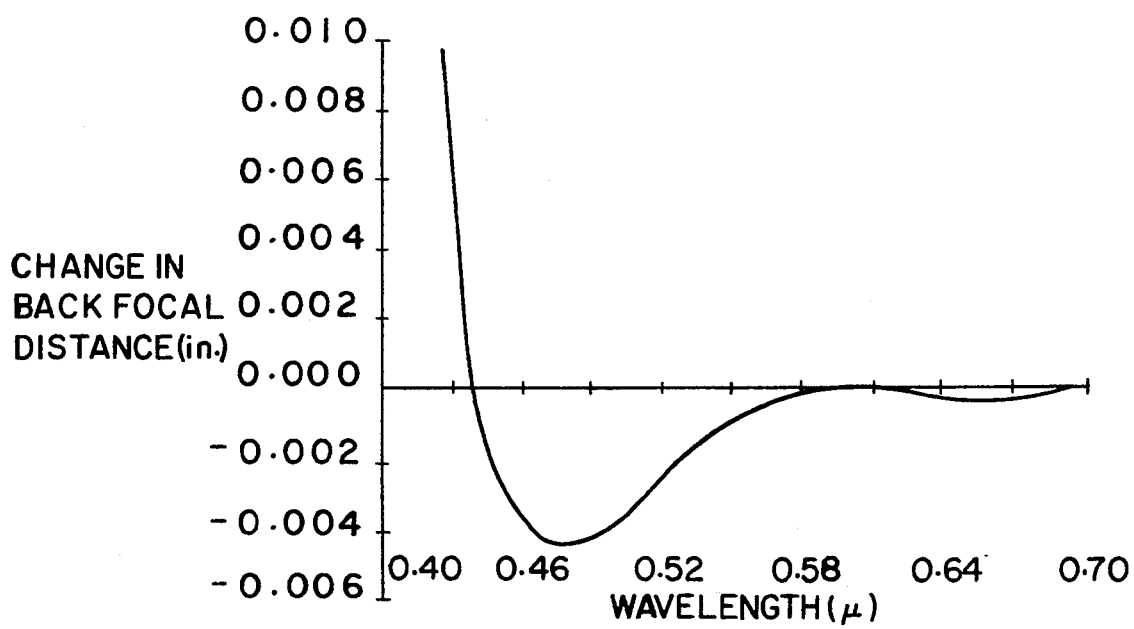

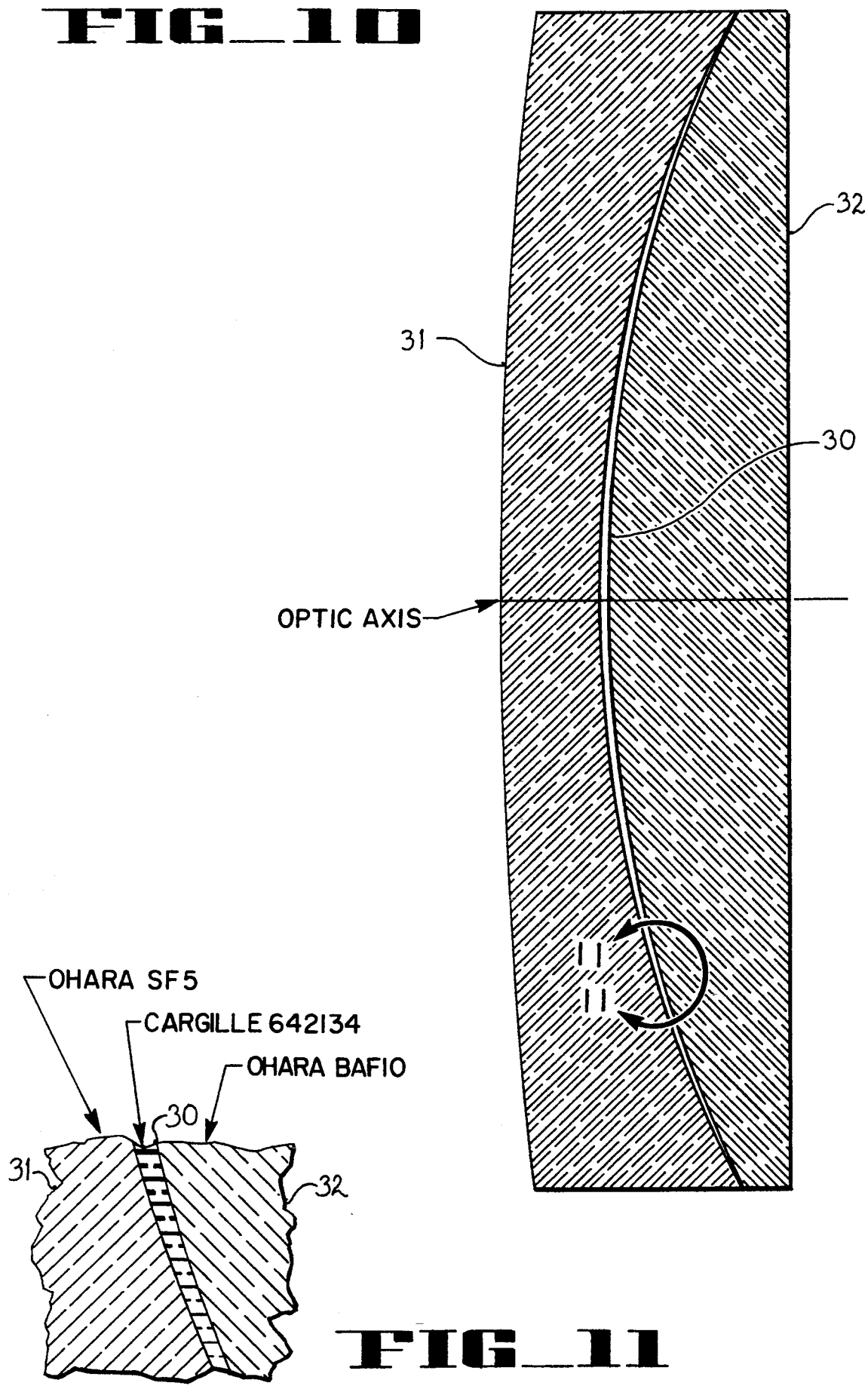

FIG_12
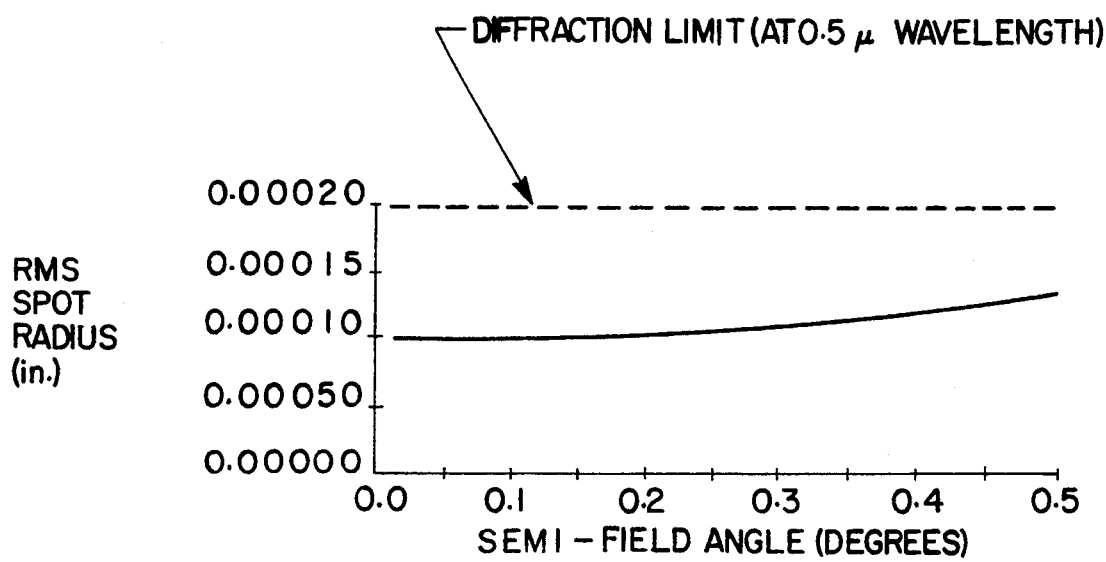
FIG_13
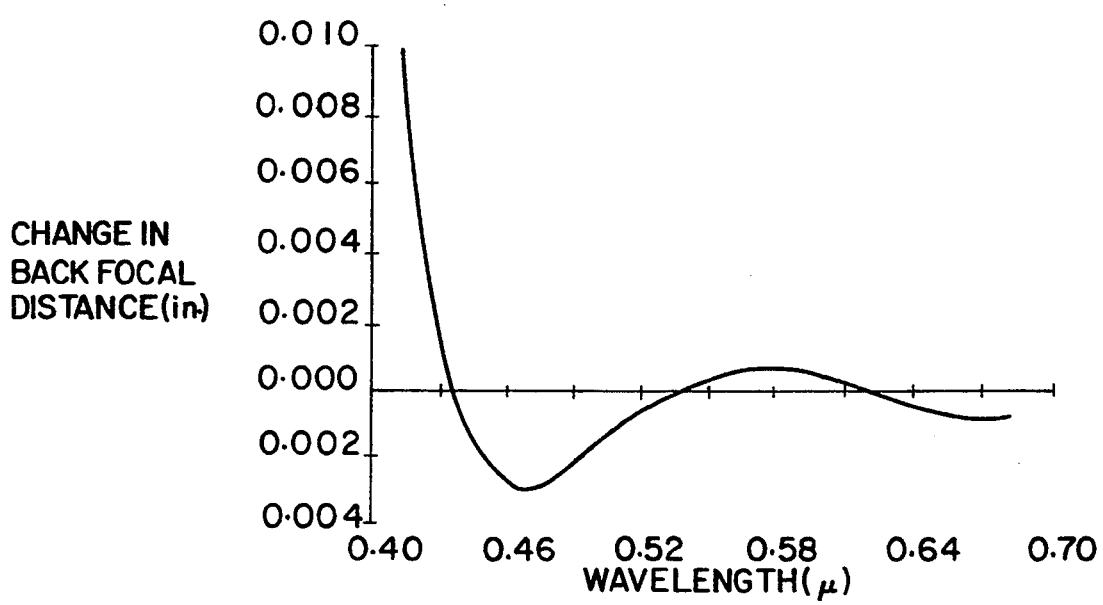

FIG_14
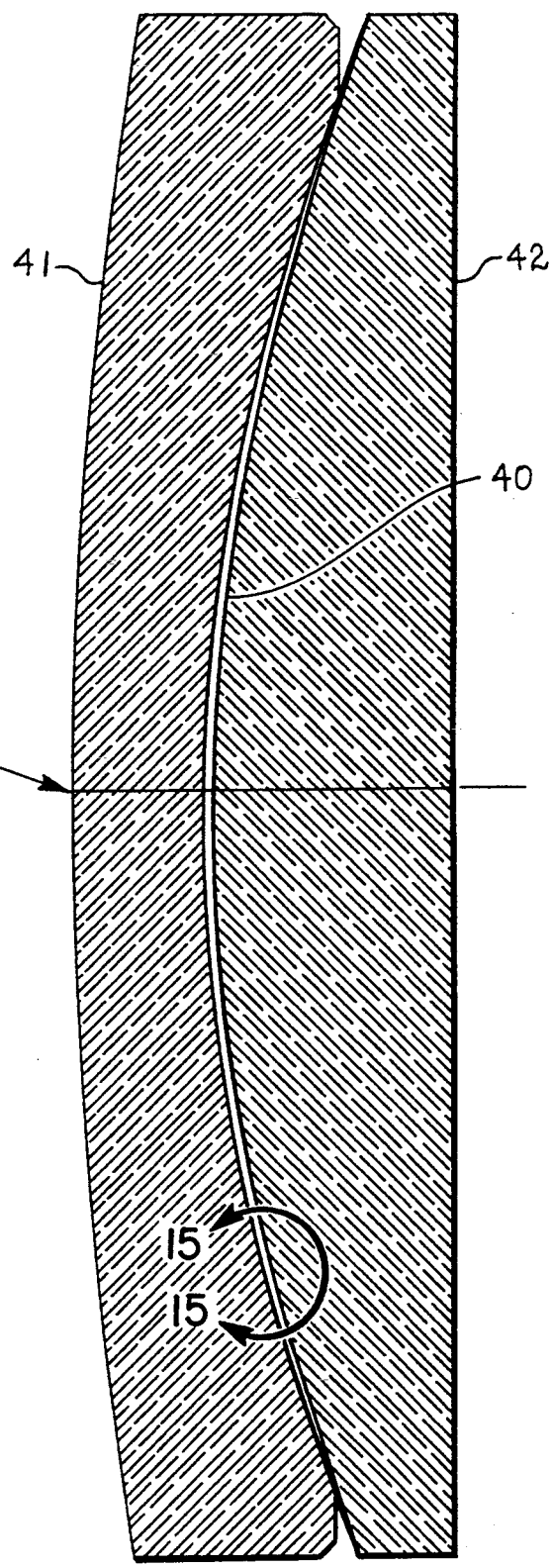
OPTIC AXIS
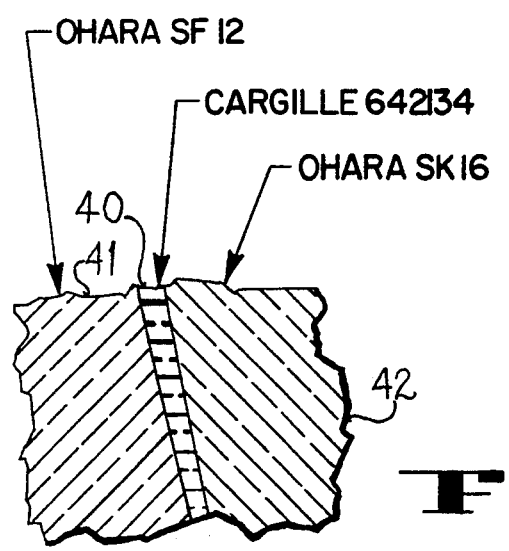
OHARA SF 12
CARGILLE 642134
OHARA SK 16
FIG_15

FIG_16
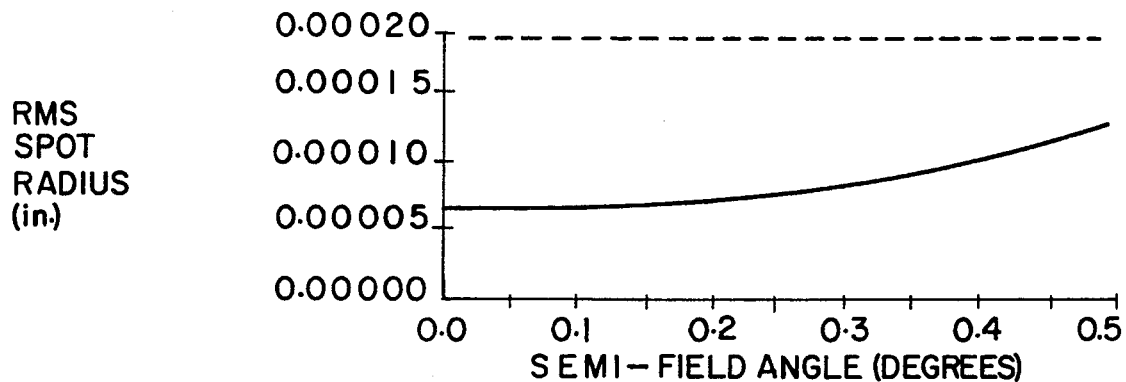
FIG_17
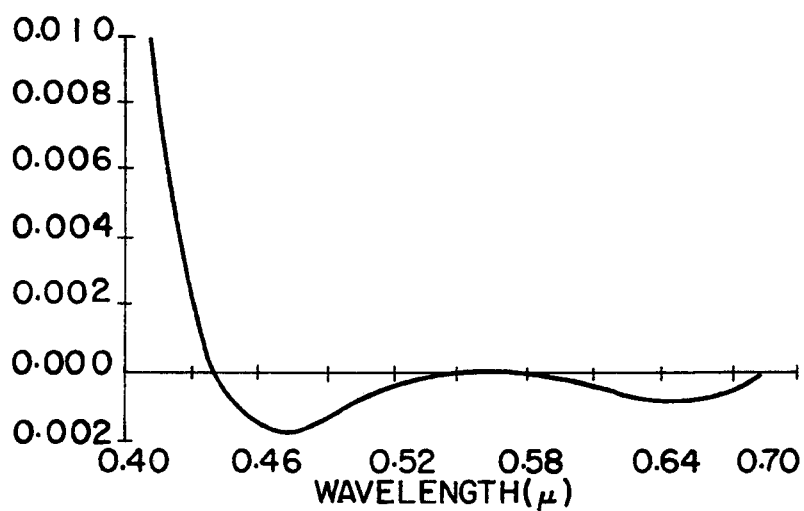

VISCOUS SUPERCOOLED LIQUID LENS ELEMENTS HAVING ABNORMAL DISPERSION

TECHNICAL FIELD

This invention relates generally to liquid refractive elements used in very highly corrected optical systems, and more particularly to a type of lens triplet comprising a liquid lens element consisting of a viscous supercooled liquid of abnormal dispersion contained between a pair of glass lens elements of normal dispersion.

BACKGROUND ART

In the art of optical design, it is conventional to use optical glasses and crystals that exhibit abnormal dispersion in combination with optical glasses that exhibit normal dispersion in order to reduce secondary spectrum (i.e., to correct for chromatic aberration). However, optical glasses and crystals exhibiting abnormal dispersion generally are very expensive, have poor mechanical properties, and are limited in availability and in optical quality.

In U.S. Pat. No. 4,958,919 to R. D. Sigler, it was noted that many liquids (i.e., "fluidal liquids"—meaning liquids that flow so as to assume the shapes of their containers) exhibit abnormal dispersion. The term "liquid" as used herein indicates a "fluidal liquid", and excludes glasses. Glasses, although technically classifiable as supercooled liquids, are nevertheless substantially rigid at the usual operating temperatures of optical systems, and do not perceptibly "flow" during operational time intervals of optical systems.

A technique was disclosed in the aforementioned Sigler patent for selecting a liquid of abnormal dispersion to be used as a liquid lens element contained between two specified glass lens elements of normal dispersion in designing a lens system having a desired degree of color correction or reduced secondary spectrum. Until very recently, liquids had not been used as refractive elements in optical systems for the specific purpose of reducing secondary spectrum or achieving color correction.

The dispersion characteristics of liquids have still not been thoroughly investigated. Except for an article by R. D. Sigler published in *Applied Optics*, Vol. 29, No. 16, (Jun. 1, 1990), there is an absence of published data (including refractive index measurements) in the scientific literature on the dispersion properties of liquids. In general, the prior art has failed to recognize that many liquids exhibit abnormal dispersion.

SUMMARY OF THE INVENTION

It is an object of the present invention to identify liquids of abnormal dispersion that are suitable in forming liquid refractive elements to be used in combination with optical glasses of normal dispersion in designing optical systems having a very high degree of color correction.

It is a particular object of the present invention to identify liquids of abnormal dispersion that are suitable in forming liquid lens elements for use in color-corrected lens systems, where the liquids so used are highly viscous and very abnormally dispersive—so that only a very thin liquid lens element (i.e., a very small volume of liquid) is ordinarily needed.

It is also an object of the present invention to identify liquids of abnormal dispersion that are suitable in forming liquid lens elements for use in color-corrected lens systems, where the liquids so used are supercooled and remain substantially transparent at visible wavelengths without becoming opaque at thermal operating extremes (i.e., at temperatures in a range from about $-50°$ C. to $+50°$ C.).

It is likewise an object of the present invention to identify liquids of abnormal dispersion that are suitable in forming liquid refractive elements for use in color-corrected optical systems, where the liquids so used are sufficiently viscous to preclude formation of thermally induced fine-scale variations in refractive index.

It is another object of the present invention to provide a few examples of color-corrected lens systems (viz., telescope objectives) comprising liquid lens elements consisting of abnormally dispersive liquids selected from a series of high-dispersion liquids of proprietary composition marketed by R. P. Cargille Laboratories Inc., of Cedar Grove, N.J. under the catalog designation "Series EC31".

In designing any highly color-corrected optical system, the selection of compatible optical materials for the lens elements of the system is critical. In practice, the optical designer inspects the dispersion characteristics of all available optical materials with the goal of identifying two or more optical materials that can function in combination with each other to permit the degree of color correction desired for the system to be achieved.

The dispersion characteristics of optical materials can be represented by several different mathematical models. The model most commonly used by optical designers at the present time for representing the dispersion characteristics of optical materials is the Herzberger partial dispersion model. The less well-known Buchdahl dispersion model, which is discussed by H. A. Buchdahl in *Optical Aberration Coefficients*, Dover Publications, Inc., New York (1968), has been found to have certain computational advantages over the Herzberger partial dispersion model, and hence has been utilized in the research leading to the present invention. However, the design of a color-corrected optical system according to the present invention does not depend upon the particular mathematical model utilized to represent the dispersion characteristics of the optical materials selected for the lens elements of the system.

According to the Buchdahl dispersion model, the dispersion of an optical material at a given wavelength $\lambda$ relative to a specified base wavelength $\lambda_0$ (typically 0.574 micron) is defined as the change in refractive index $\delta N$ of the material as a function of change in wavelength $\delta \lambda$ relative to the base wavelength $\lambda_0$, i.e., $$\delta N(\lambda) = N(\lambda) - N_0.$$

This change in refractive index $\delta N$ as a function of change in wavelength can be expressed as a simple power series equation of the form $$\delta N(\lambda) = \sum_{i=1}^{\infty} \nu_i \omega^i,$$

which is referred to as Buchdahl's dispersion equation.

The variable $\omega$ in Buchdahl's dispersion equation is called the chromatic coordinate, which is defined as $\omega = \delta \lambda / (1 + \alpha \delta \lambda)$, where $\alpha$ is a so-called "universal constant" that is substantially independent of the dispersion characteristics of the particular optical material for wavelengths in the visible spectrum. The value of $\alpha$ is usually given as 2.5. The coefficients $v_i$ in Buchdahl's dispersion equation are called dispersion coefficients, which are constants that are characteristic of the particular optical material. Corresponding dispersion coefficients generally vary from one material to another.

The coefficient of the first term in the power series expression $$\sum_{i=1}^{\infty} v_i \omega^i$$

is called the primary dispersion coefficient, the coefficient of the second term is called the secondary dispersion coefficient, and so on for higher-order terms. If the primary dispersion coefficients for all optical materials of interest to an optical designer are plotted against the secondary dispersion coefficients for the same optical materials in a rectangular Cartesian coordinate system, a graphical distribution of points (called a Buchdahl dispersion plot) is obtained in which each point represents a corresponding optical material. This Buchdahl dispersion plot is analogous to a conventional Herzberger partial dispersion plot in which Abbe numbers are plotted against partial dispersion values for the optical materials.

In a Buchdahl dispersion plot, the primary and secondary dispersion coefficients used to define the coordinate system are usually expressed as $\eta_1$ and $\eta_2$, where $\eta_i = v_i/(N_0 - 1)$. A thorough discussion of Buchdahl's dispersion equation, and of the relationship between the $\eta$-dispersion coefficients and the $v$-dispersion coefficients, is found in U.S. Pat. No. 5,020,889.

In a conventional Herzberger partial dispersion plot, the points representing most commercially available optical glasses are generally clustered about a straight line called the "normal line". Optical materials represented by points lying relatively close to the "normal line" are said to have "normal" dispersion; and optical materials represented by points lying relatively far away from the "normal line" are said to have "abnormal" dispersion.

Similarly, in a Buchdahl dispersion plot, the points representing most commercially available optical glasses are generally clustered about a straight line, which (by analogy to the "normal line" of the Herzberger partial distribution plot) is called the "normal line for glasses". The "normal line for glasses" in a Buchdahl dispersion plot is formed by connecting the points representing two commercially available glasses that are known to exhibit "normal" dispersion—viz., Schott BK7 glass and Schott F2 glass. Ordinarily, optical systems are designed using refractive elements made of normal-dispersion glasses. Optical glasses exhibiting abnormal dispersion are generally considered to be somewhat exotic, usually have poor mechanical properties, and tend to be quite expensive.

FIG. 1 is a Buchdahl dispersion plot for two particular categories of optical materials, viz.:

1) Optical glasses marketed by Schott Optical Glass, Inc. of Duryea, Pa., most of which are normal-dispersion glasses (i.e., glasses having primary and secondary dispersion coefficients that define coordinates for points clustered about the "normal line for glasses"), and only a relatively few of which are abnormal-dispersion glasses (i.e., glasses having primary and secondary dispersion coefficients that define coordinates for points located away from the "normal line for glasses" by any significant amount); and 2) Cargille "Series EC31" liquids—i.e., certain viscous supercooled liquids of remarkably abnormal dispersion, which have recently been made commercially available by R. P. Cargille Laboratories, Inc. of Cedar Grove, N.J.

The Schott optical glasses represented on the Buchdahl dispersion plot shown in FIG. 1—two of which are labelled in FIG. 1 by the manufacturer's catalog designations (viz., BK7 glass and F2 glass)—are well-known to optical designers. The points representing the Schott optical glasses indicated in FIG. 1 are for the most part clustered tightly along the line labelled the "normal line for glasses".

The Cargille "Series EC31" liquids represented on the Buchdahl dispersion plot shown in FIG. 1—two of which are labelled in FIG. 1 according to U.S. Mil-Spec designations (viz., 557200 liquid and 642134 liquid)—are relatively new products on the market. The points representing the Cargille "Series EC31" liquids indicated in FIG. 1 are located quite far away from the "normal line for glasses", which indicates that all the Cargille "Series EC31" liquids exhibit remarkably abnormal dispersion. At room temperature, the Cargille "Series EC31" liquids have a viscosity considerably greater than that of most other optical liquids. Liquids at the high-dispersion end of the series (e.g., Cargille 642134 liquid) are especially viscous at room temperature.

Cargille "Series EC31" liquids are commercially available in formulations that are quality-controlled by the manufacturer to a sufficient extent to assure that batch-to-batch variations in refractive index are insignificant to about the fourth decimal place. For optical design purposes, such accuracy is often sufficient to provide at least a tentative indication of the suitability of a particular liquid for use in combination with one or more particular types of optical glasses for achieving color-correction at a specified number of wavelengths. However, once a particular liquid has been identified as a possible candidate for use in combination with a particular optical glass or glasses to achieve a specified degree of color correction, more accurate refractive index measurements over a range of wavelengths is usually needed in order to develop an optimized optical design (i.e., optical prescription) for an optical system utilizing such a liquid.

It has long been recognized by optical designers that in order to design a refractive system with reduced secondary spectrum, at least one refractive element of the system must be made of an abnormal-dispersion material. Thus, in order to design a lens system consisting of a liquid lens element contained between two normal-dispersion glass lens elements, it is necessary that the liquid lens element have abnormal dispersion in order for the lens system to have reduced secondary spectrum. In accordance with the present invention, it has been determined that abnormal-dispersion liquids (in particular, Cargille "Series EC31" liquids) are less expensive, and have better dispersion properties—i.e., are located further away from the "normal line for glasses" in the Buchdahl dispersion plot—than any currently known rigid optical materials (i.e., glasses, crystals and plastics) of abnormal dispersion.

In general, to minimize monochromatic aberrations—particularly spherical aberration—in a lens system, it is desirable that the optical powers of the individual lens elements of the system be as low as possible (i.e., that the lens elements be as thin as possible). In order to develop a design form for a lens system that is well-corrected for monochromatic aberrations as well as for chromatic aberration (i.e., a design form with relatively thin lens elements), it is necessary that the abnormal-dispersion lens element (or elements) of the system be highly dispersive. In terms of the Buchdahl dispersion plot, it is necessary that the point (or points) representing the abnormal-dispersion lens element (or elements) be as widely separated as possible from the "normal line for glasses" and be located as far as possible from the origin of the Buchdahl dispersion plot. In mathematical terms, it is necessary that the indices of refraction of the abnormal-dispersion lens elements have large negative primary dispersion coefficients. The recently introduced Cargille "Series EC31" liquids have these required characteristics to a degree that is unmatched by any other currently known optical liquids.

In designing a highly corrected lens system comprising a liquid lens element (or elements) for use in an environment in which temperature is not constant, the liquid (or liquids) selected for use as the liquid lens element (or elements) of the system must remain transparent (i.e., not become opaque or cloudy), and must remain in the liquid state (i.e., not form crystals that could scatter light or otherwise degrade performance), throughout the operational temperature range of the system. Furthermore, it is advantageous for the liquid (or liquids) selected for use as the liquid lens element (or elements) of the system to be sufficiently viscous to preclude thermal convection currents that could cause localized changes in the refractive index of the liquid (or liquids). Until Cargille "Series EC31" liquids were investigated in connection with research leading to the present invention, abnormal-dispersion liquids that are both viscous and substantially transparent at low temperatures (i.e., temperatures of 0° C. or less) were unknown to optical designers.

The high-dispersion members of the Cargille "Series EC31" liquids (i.e., those Cargille "Series EC31" liquids with primary dispersion coefficients less than −0.03) have viscosities greater than 2400 centistokes at room temperature. Within the operational temperature range for most optical instruments (e.g., 25° C.±20° C.), Cargille "Series EC31" liquids—particularly the high-dispersion members of the series—are too viscous to permit refractive index filimentation attributable to thermal convection currents to develop. Furthermore, the liquids of the Cargille "Series EC31" are supercooled—i.e., they have a glass-like structure (rather than a crystalline solid structure) when cooled to temperatures below their transition temperature. Thus, Cargille "Series EC31" liquids remain substantially transparent (i.e., they do not crystallize) no matter how low the temperature becomes.

The high viscosity, the absence of crystallization, and the remarkable abnormal dispersion properties of Cargille "Series EC31" liquids make these liquids very useful in designing lens systems with reduced secondary spectrum.

DESCRIPTION OF THE DRAWING

FIG. 1 is a Buchdahl dispersion plot for Schott optical glasses and Cargille "Series EC31" liquids.

FIG. 2 is a profile drawing of a telescope objective with reduced secondary spectrum, which comprises a Schott SK14 glass lens element, a Cargille 642134 liquid lens element, and a Schott F1 glass lens element according to the present invention.

FIG. 3 is an enlarged view of a portion of the telescope objective enclosed within line 3—3 of FIG. 2.

FIG. 4 is a plot of RMS spot radius versus semi-field angle for the telescope objective of FIG. 2.

FIG. 5 is a plot of change in back focal distance versus wavelength for the telescope objective of FIG. 2.

FIG. 6 is a profile drawing of a telescope objective with reduced secondary spectrum, which comprises an Ohara SF5 glass lens element, a Cargille 642134 liquid lens element, and a Hoya LAC7 glass lens element according to the present invention.

FIG. 7 is an enlarged view of a portion of the telescope objective enclosed within line 7—7 of FIG. 6.

FIG. 8 is a plot of RMS spot radius versus semi-field angle for the telescope objective of FIG. 6.

FIG. 9 is a plot of change in back focal distance versus wavelength for the telescope objective of FIG. 6.

FIG. 10 is a profile drawing of a telescope objective with reduced secondary spectrum, which comprises an Ohara SF5 glass lens element, a Cargille 642134 liquid lens element, and an Ohara BAF10 glass lens element according to the present invention.

FIG. 11 is an enlarged view of a portion of the telescope objective enclosed within line 11—11 of FIG. 10.

FIG. 12 is a plot of RMS spot radius versus semi-field angle for the telescope objective of FIG. 10.

FIG. 13 is a plot of change in back focal distance versus wavelength for the telescope objective of FIG. 10.

FIG. 14 is a profile drawing of a telescope objective with reduced secondary spectrum, which comprises an Ohara SF12 glass lens element, a Cargille 642134 liquid lens element, and an Ohara SK16 glass lens element according to the present invention.

FIG. 15 is an enlarged view of a portion of the telescope objective enclosed within line 15—15 of FIG. 14.

FIG. 16 is a plot of RMS spot radius versus semi-field angle for the telescope objective of FIG. 14.

FIG. 17 is a plot of change in back focal distance versus wavelength for the telescope objective of FIG. 14.

BEST MODE OF CARRYING OUT THE INVENTION

In FIG. 2, a first embodiment of a lens system (viz., a telescope objective) with reduced secondary spectrum according to the present invention is illustrated. The telescope objective of FIG. 2 is a lens triplet comprising a liquid lens element 10 contained between two glass lens elements 11 and 12. The glass lens elements 11 and 12 are coaxially mounted by an appropriate mounting technique so as to contain the liquid lens element 10 therebetween. An effective mounting technique for a lens system comprising glass and liquid lens elements is described in co-pending U.S. patent application Ser. No. 08/014,596 filed on Feb. 8, 1993.

In FIG. 3, an enlarged view of a portion of the telescope objective of FIG. 2 is shown indicating the materials of which the lens elements 10, 11 and 12 are made. The lens triplet of FIG. 2 has an optical prescription, which is specified in tabular format for a telescope of 5.5-in. aperture diameter, 44-in. focal length and f/8 focal ratio, as follows:

TABLE I

| Surface No. | Radius (inches) | Thickness (inches) | $N_d$ | $V_d$ | Material |
|---|---|---|---|---|---|
| 1 | 28.3202 | 0.9000 | | | Air |
| 2 | −11.1591 | 0.0362 | 1.60311 | 0.003 | SK14 |
| 3 | −10.2791 | 0.5000 | 1.64282 | 4.570 | 642134 |
| 4 | −184.8489 | 43.1876 | 1.62588 | 0.950 | F1 |
| 5 | −18.7887 | 0.0000 | | | Air | where the surfaces of the lens elements are numbered consecutively from left to right along the optic axis in accordance with optical design convention.

In TABLE I, surface No. 2 is common to the glass lens element 11 (which is made of Schott SK14 glass) and the liquid lens element 10. Similarly, surface No. 3 is common to the liquid lens element 10 and the glass lens element 12 (which is made of Schott F1 glass). The Schott SK14 and Schott F1 glasses are marketed by Schott Optical Glass, Inc. of Duryea, Pa. The liquid lens element 10 consists of a particular high-dispersion liquid of proprietary composition, which is marketed by R. P. Cargille Laboratories, Inc. of Cedar Grove, N.J. as one of a series of liquids designated as "Series EC31" liquids. The particular Cargille "Series EC31" liquid used for the liquid lens element 10 is identified as Cargille 642134 liquid.

Each individual member of the Cargille "Series EC31" liquids can be uniquely specified in terms of its optical characteristics by means of a code number, which is based on the U.S. Mil-Spec system for specifying optical materials. Thus, the designation "642134" as used in TABLE I specifies a material whose index of refraction at the wavelength of the sodium d spectral line (i.e., 0.5893 micron) has a value of 1.642 to the third decimal place, and whose Abbe number has a value of 13.4 to the first decimal place.

All the surfaces listed in TABLE I are spherical. The radii listed in the second column of TABLE I are the radii of curvature (expressed in inches) of the corresponding surfaces measured along the optic axis. The radius of curvature of a given surface is positive if the center of curvature of the surface lies to the right of the surface, and negative if the center of curvature of the surface lies to the left of the surface. The diameter of each lens element is assumed to be 5.7 inches. The aperture stop, which has a diameter of 5.5 inches, is located at surface No. 1. The thicknesses listed in the third column of TABLE I are the thicknesses (expressed in inches) of the corresponding lens elements bounded on the left by the respective surfaces measured along the optic axis.

The values listed in the fourth column (which is headed $N_d$) of TABLE I are the indices of refraction of the corresponding lens elements bounded on the left by the respective surfaces for the wavelength of the sodium d spectral line (i.e., 0.5893 micron). The values listed in the fifth column (which is headed $V_d$) of TABLE I are the Abbe numbers for the corresponding lens elements bounded on the left by the respective surfaces for the same wavelength.

In general, the index of refraction of an optical material varies with wavelength. To evaluate the performance of the lens triplet of FIG. 2 over a useful wavelength range, five wavelengths in the visible region of the electromagnetic spectrum were selected for which the corresponding values of the index of refraction are listed as follows:

TABLE II

| Surf. No. | INDEX OF REFRACTION | | | | | Abbe No. |
|---|---|---|---|---|---|---|
| | $N_1$ | $N_2$ | $N_3$ | $N_4$ | $N_5$ | |
| 1 | 1.603110 | 1.610026 | 1.600074 | 1.615413 | 1.598340 | 60.000 |
| 2 | 1.642820 | 1.678355 | 1.630567 | 1.712620 | 1.624554 | 13.451 |
| 3 | 1.625882 | 1.638268 | 1.620738 | 1.648507 | 1.617901 | 35.703 | where $N_1$ is the index of refraction at a specified base wavelength of 0.58756 micron, and $N_2$, $N_3$, $N_4$ and $N_5$ are the indices of refraction at specified wavelengths on either side of the base wavelength. Thus, $N_2$ is the refractive index at 0.48613 micron; $N_3$ is the refractive index at 0.65627 micron; $N_4$ is the refractive index at 0.48000 micron; and $N_5$ is the refractive index at 0.70652 micron.

An indication of performance of a lens system at a given wavelength is provided by a plot of root-mean-square (RMS) spot radius versus semi-field angle for the lens system at the given wavelength. In FIG. 4, a plot of RMS spot radius (measured in inches) versus semi-field angle (measured in degrees) is provided for the telescope objective of FIG. 2 at the 0.50 micron wavelength. The telescope objective of FIG. 2 has a relatively narrow field of view of only 1.0° (i.e., a semi-field angle of O.5°). It is apparent from FIG. 4 that the RMS spot radius for the telescope objective of FIG. 2 remains very small (i.e., less than 0.0001 in.) over the entire field of view.

The back focal distance of a lens system for a given wavelength is defined as the distance along the optic axis of the lens system between the optimum focal plane position for the given wavelength and the lens surface closest to that optimum focal plane position. The back focal distance of a lens system at some arbitrarily specified wavelength—e.g., a wavelength at which paraxial marginal rays passing through the system are brought to a focus at the optimum focal plane position—can be considered as a "baseline" back focal distance for the lens system. The change in back focal distance from the "baseline" back focal distance as a function of wavelength provides a measure of the extent of axial chromatic correction of the lens system.

FIG. 5 is a plot of change in back focal distance versus wavelength at the focal plane of the telescope objective shown in FIG. 2. The curve plotted in FIG. 5 indicates the chromatic variation in optimal focal position. The curve almost touches the horizontal axis at about 0.50 micron, and would actually cross the horizontal axis at two wavelengths in the vicinity of 0.50 micron if the focus of the system were changed only slightly. Furthermore, the curve in FIG. 5 intersects the horizontal axis at about 0.58 micron and 0.62 micron. Thus, in practical effect, the telescope objective of FIG. 2 can be considered as a superachromat that is substantially color-corrected at four wavelengths. More interestingly, however, the curve in FIG. 5 is extremely close to the horizontal axis throughout the entire wavelength range from 0.43 micron to 0.67 micron, which indicates that the telescope objective of FIG. 2 has only an insignificant amount of chromatic aberration throughout that entire wavelength range.

It is remarkable that the reduced secondary spectrum obtained by the telescope objective of FIG. 2, which effectively amounts to color correction at four wavelengths, is achieved without using a lens element made of an exotic and expensive abnormal-dispersion glass. The only optical materials used are two common and relatively inexpensive optical glasses of normal dispersion (viz., Schott SK14 glass and Schott F1 glass) and a small quantity of Cargille 642134 liquid.

A second embodiment of a lens system according to the present invention, as illustrated in FIG. 6, is a telescope objective comprising a liquid lens element 20 contained between two glass lens elements 21 and 22. In FIG. 7, an enlarged view of a portion of the telescope objective of FIG. 6 is shown indicating the materials of which the lens elements 20, 21 and 22 are made. The lens triplet of FIG. 6 has an optical prescription, which is specified in tabular format for a telescope of 5.5-in. aperture diameter, 44-in. focal length, and f/8 focal ratio, as follows:

TABLE III

| Surface No. | Radius (inches) | Thickness (inches) | $N_d$ | $V_d$ | Material |
|---|---|---|---|---|---|
| 1 | 24.6554 | 0.0000 | | | Air |
| 2 | 8.4735 | 0.5000 | 1.67270 | 0.952 | SF5 |
| 3 | 9.1706 | 0.0411 | 1.64282 | 4.570 | 642134 |
| 4 | 317.6253 | 0.8250 | 1.65160 | −0.031 | LAC7 |
| 5 | −20.8667 | 43.0722 | | | Air | where the surfaces (numbered consecutively from left to right along the optic axis) are all spherical; and where the radii, thicknesses, and values for $N_d$ and $V_d$ are listed in accordance with the convention explained above in connection with TABLE I. The glass lens element 21 is made of Ohara SF5 glass, which is marketed by Ohara Optical Glass Mfg. Co., Ltd. of Sagamihara, Japan; and the glass lens element 22 is made of Hoya LAC7 glass, which is marketed by Hoya Corporation of Tokyo, Japan. The liquid lens element 20 consists of the particular Cargille Series EC31 liquid specified by code number 642134 according to the convention explained above.

To evaluate the performance of the telescope objective of FIG. 6 over a useful wavelength range, five wavelengths in the visible region of the electromagnetic spectrum were selected for which the corresponding values of the index of refraction are listed as follows:

TABLE IV

| Surf. No. | INDEX OF REFRACTION | | | | | Abbe No. |
| | $N_1$ | $N_2$ | $N_3$ | $N_4$ | $N_5$ | |
|---|---|---|---|---|---|---|
| 1 | 1.672700 | 1.687553 | 1.666598 | 1.699960 | 1.663254 | 31.101 |
| 2 | 1.642820 | 1.678355 | 1.630567 | 1.712620 | 1.624554 | 13.451 |
| 3 | 1.651599 | 1.659363 | 1.648207 | 1.665384 | 1.646279 | 58.403 | where $N_1$, $N_2$, $N_3$, $N_4$ and $N_5$, refer to the indices of refraction at the same wavelengths as specified above in connection with TABLE II.

In FIG. 8, a plot of RMS spot radius (measured in inches) versus semi-field angle (measured in degrees) is provided for the telescope objective of FIG. 6 at the 0.50 micron wavelength. The telescope objective of FIG. 6 has a field of view of only 1.0° (i.e., a semi-field angle of O.5°). It is apparent from FIG. 8 that the RMS spot radius for the telescope objective of FIG. 6 remains small (i.e., less than 0.0002 in.) over the entire field of view.

FIG. 9 is a plot of change in back focal distance versus wavelength at the focal plane of the telescope objective of FIG. 6. The four crossings of the horizontal axis by the curve in FIG. 9 indicate that the telescope objective of FIG. 6 is color-corrected at four wavelengths. The closeness of the back focal distance curve to the horizontal axis in FIG. 9 in the wavelength range from 0.43 micron to 0.70 micron indicates that the telescope objective of FIG. 6 has only insignificant chromatic aberration throughout that entire wavelength range.

A third embodiment of a lens system according to the present invention, as illustrated in FIG. 10, is a telescope objective comprising a liquid lens element 30 contained between two glass lens elements 31 and 32. In FIG. 11, an enlarged view of a portion of the telescope objective of FIG. 10 is shown indicating the materials of which the lens elements 30, 31 and 32 are made. The lens triplet of FIG. 10 has an optical prescription, which is specified in tabular format for a telescope of 5.5-in. aperture diameter, 44-in. focal length, and f/8 focal ratio, as follows:

TABLE V

| Surface No. | Radius (inches) | Thickness (inches) | $N_d$ | $V_d$ | Material |
|---|---|---|---|---|---|
| 1 | 27.0576 | 0.5000 | | | Air |
| 2 | 6.6671 | 0.0411 | 1.67270 | 0.952 | SF5 |
| 3 | 7.0385 | 0.9000 | 1.64282 | 4.570 | 642134 |
| BA | 4312.7556 | 43.0709 | 1.67003 | 0.238 | BAF10 |
| 5 | −14.3168 | 0.0000 | | | Air | where the surfaces (numbered consecutively from left to right along the optic axis) are all spherical; and where the radii, thicknesses, and values for $N_d$ and $V_d$ are listed in accordance with the convention explained above in connection with TABLE I. The glass lens element 31 is made of Ohara SF5 glass, and the glass lens element 32 is made of Ohara BAF10 glass. The liquid lens element 30 consists of the particular Cargille EC31 liquid specified by code number 642134 according to the convention explained above.

To evaluate the performance of the telescope objective of FIG. 10 over a useful wavelength range, five wavelengths in the visible region of the electromagnetic spectrum were selected for which the corresponding values of the index of refraction are listed as follows:

TABLE VI

| Surf. No. | INDEX OF REFRACTION | | | | | Abbe No. |
| | $N_1$ | $N_2$ | $N_3$ | $N_4$ | $N_5$ | |
|---|---|---|---|---|---|---|
| 1 | 1.672700 | 1.687553 | 1.666598 | 1.699960 | 1.663254 | 32.101 |
| 2 | 1.642820 | 1.678355 | 1.630567 | 1.712620 | 1.624554 | 13.451 |

TABLE VI-continued

| Surf. No. | INDEX OF REFRACTION | | | | | Abbe No. |
| --- | --- | --- | --- | --- | --- | --- |
| | $N_1$ | $N_2$ | $N_3$ | $N_4$ | $N_5$ | |
| 3 | 1.670029 | 1.679980 | 1.665800 | 1.687981 | 1.663436 | 47.253 | where $N_1$, $N_2$, $N_3$, $N_4$ and $N_5$, refer to the indices of refraction at the same wavelengths as indicated in TABLES II and IV.

In FIG. 12, a plot of RMS spot radius (measured in inches) versus semi-field angle (measured in degrees) is provided for the telescope objective of FIG. 10 at the 0.50 micron wavelength. The telescope objective of FIG. 10 has a field of view of only 1.0° (i.e., a semi-field angle of 0.5°). It is apparent from FIG. 12 that the RMS spot radius for the telescope objective of FIG. 10 remains small (i.e., less than 0.0002 in.) over the entire field of view.

FIG. 13 is a plot of change in back focal distance versus wavelength at the focal plane of the telescope objective shown in FIG. 10. The three crossings of the horizontal axis by the curve in FIG. 13 in the visible region of the electromagnetic spectrum (as well as an extrapolated additional crossing in the near infrared region) indicate that the telescope objective of FIG. 10 is color-corrected at four wavelengths. The closeness of the back focal distance curve to the horizontal axis in FIG. 13 in the wavelength range from 0.43 micron to well into the near infrared region indicates that the lens triplet of FIG. 10 has only insignificant chromatic aberration throughout that wavelength range.

A fourth embodiment of a lens system according to the present invention, as illustrated in FIG. 14, is a telescope objective comprising a liquid lens element 40 contained between two glass lens elements 41 and 42. In FIG. 15, an enlarged view of a portion of the telescope objective of FIG. 14 is shown indicating the materials of which the lens elements 40, 41 and 42 are made. The lens triplet of FIG. 14 has an optical prescription, which is specified in tabular format for a telescope of 5.5-in. aperture diameter, 44-in. focal length, and f/8 focal ratio, as follows:

TABLE VII

| Surface No. | Radius (inches) | Thickness (inches) | $N_d$ | $V_d$ | Material |
| --- | --- | --- | --- | --- | --- |
| 1 | 22.1205 | 0.5000 | | | Air |
| 2 | 7.8490 | 0.0369 | 1.64831 | 0.950 | SK12 |
| 3 | 8.3687 | 0.9000 | 1.64282 | 4.570 | 642134 |
| 4 | 212.1500 | 42.2378 | 1.62041 | −0.024 | SK16 |
| 5 | −16.5066 | 0.0000 | | | Air | where the surfaces (numbered consecutively from left to right along the optic axis) are all spherical; and where the radii, thicknesses, and values for $N_d$ and $V_d$ are listed in accordance with the convention explained above in connection with TABLE I. The glass lens element 41 is made of Ohara SK12 glass, and the glass lens element 42 is made of Ohara SK16 glass. The liquid lens element 40 consists of the particular Cargille EC31 liquid specified by code number 642134 according to the convention explained above.

To evaluate the performance of the lens triplet of FIG. 14 over a useful wavelength range, five wavelengths in the visible region of the electromagnetic spectrum were selected for which the corresponding values of the index of refraction are listed as follows:

TABLE VIII

| Surf. No. | INDEX OF REFRACTION | | | | | Abbe No. |
| --- | --- | --- | --- | --- | --- | --- |
| | $N_1$ | $N_2$ | $N_3$ | $N_4$ | $N_5$ | |
| 1 | 1.648308 | 1.661869 | 1.642708 | 1.673140 | 1.639629 | 33.833 |
| 2 | 1.642820 | 1.678355 | 1.630567 | 1.712620 | 1.624554 | 13.451 |
| 3 | 1.620411 | 1.627571 | 1.617278 | 1.633155 | 1.615492 | 60.271 | where $N_1$, $N_2$, $N_3$, $N_4$ and $N_5$, refer to the indices of refraction at the same wavelengths as indicated in TABLES II, IV and VI.

In FIG. 16, a plot of RMS spot radius (measured in inches) versus semi-field angle (measured in degrees) is provided for the telescope objective of FIG. 14 at the 0.50 micron wavelength. The telescope objective of FIG. 14 has a field of view of only 1.0° (i.e., a semi-field angle of 0.5°). It is apparent from FIG. 16 that the RMS spot radius for the telescope objective of FIG. 14 remains small (i.e., less than 0.0002 in.) over the entire field of view.

FIG. 17 is a plot of change in back focal distance versus wavelength at the focal plane of the lens triplet shown in FIG. 14. The four crossings of the horizontal axis by curve in FIG. 17 indicate that the telescope objective of FIG. 14 is color-corrected at four wavelengths. The closeness of the back focal distance curve to the horizontal axis in FIG. 17 in the wavelength range from 0.43 micron to beyond 0.70 micron into the infrared region of the electromagnetic spectrum indicates that the telescope objective of FIG. 14 has only insignificant chromatic aberration throughout that wavelength range.

In each of the exemplary lens systems illustrated in FIGS. 2, 6, 10 and 14, the liquid lens element consists of a commercially obtainable liquid selected from the group of high-dispersion liquids marketed by R. P. Cargille Laboratories, Inc. as "Series EC31" liquids. The chemical compositions of the Cargille "Series EC31" liquids are regarded as proprietary by the manufacturer. However, the individual Cargille "Series EC31" liquids are uniquely identifiable in terms of their relevant optical characteristics (i.e., index of refraction and Abbe number), and hence can be specified independently of their catalog designations.

Cargille "Series EC31" liquids are optically characterized by the manufacturer in terms of refractive index to third decimal place accuracy. Accuracy to the third decimal place for the index of refraction of an optical material is generally not sufficient to enable an optical designer to develop an optimized design form for a highly color-corrected lens system using that particular optical material. However, such accuracy is generally sufficient to reveal whether the particular optical material exhibits abnormal dispersion. Thus, it is apparent from data provided by the manufacturer that Cargille "Series EC31" liquids exhibit rather abnormal dispersion.

Cargille "Series EC31" liquids have not been advertised for use in forming liquid lens elements. There has been no indication in Cargille sales literature, or in any other publications, that Cargille "Series EC31" liquids would be suitable for use in combination with specified optical glasses in designing lens systems having reduced secondary spectrum. Nevertheless, on the basis of the knowledge that Cargille "Series EC31" liquids exhibit abnormal dispersion, an investigation was begun (which led to the present invention) to determine whether Cargille "Series EC31" liquids could feasibly be used to form liquid lens elements in lens systems having reduced secondary spectrum.

Cargille "Series EC31" liquids are characterized by a high viscosity, which renders them substantially incapable of supporting thermal convection currents that would degrade optical performance. Cargille "Series EC31" liquids have viscosities up to 2400 centistokes at room temperature (i.e., ~25° C.). It is instructive for purposes of comparison to note that 30-weight motor oil has a viscosity of about 500 centistokes, Karo syrup has a viscosity of about 2500 centistokes, and very thick molasses has a viscosity of about 22000 centistokes, at room temperature. Liquids heretofore used as lens elements in color-corrected optical systems, on the other hand, have generally had viscosities not higher than about 50 centistokes at room temperature. Optical designers did not previously have any experience in using highly viscous liquids in designing color-corrected optical systems.

Cargille "Series EC31" liquids are clear (i.e., substantially fully transparent to visible wavelengths) at room temperature. However, until the investigation leading to the present invention was undertaken, there had been no indication whether a liquid lens element formed from a Cargille "Series EC31" liquid would retain clarity throughout any particular temperature range specified for operation of an optical system embodying such a liquid lens element. In particular, there was no a priori indication whether Cargille "Series EC31" liquids would retain clarity at temperatures in the −20° C. to 0° C. range at which telescopes are occasionally used. The investigation leading to the present invention has determined that Cargille "Series EC31" liquids retain substantial clarity at temperatures in the −20° C. to 0° C. range.

R. P. Cargille Laboratories Inc. maintains excellent quality control standards, which assure that any batch-to-batch variations in refractive index measurements for Cargille "Series EC31" liquids can be expected to be relatively minor. Nevertheless, it would be prudent to obtain fresh refractive index measurements for each batch of any particular Cargille "Series EC31" liquid used in fabricating highly color-corrected lens systems. The optimized design forms (i.e., optical prescriptions) presented above in TABLES I, III, V and VII for the lens triplets illustrated in FIGS. 2, 6, 10 and 14 can readily be reoptimized by a skilled optical designer to accommodate minor batch-to-batch variations in refractive index measurements.

The present invention has been described above in terms of particular design forms for lens triplets to be used as telescope objectives. However, other design forms within the scope of the present invention for use in other applications (e.g., microscope objectives, camera lenses, eyepieces, projection lenses, etc.) would become apparent to practitioners skilled in the art upon perusal of the foregoing specification and accompanying drawing. Accordingly, the invention is defined more generally by the following claims and their equivalents.

I claim:

1. An optical system comprising a first rigid refractive element, a second rigid refractive element, and a liquid refractive element, said first and second rigid refractive elements and said liquid refractive element coacting with each other to provide a correction for chromatic aberration in said optical system, said liquid refractive element consisting essentially of a liquid that becomes supercooled at temperatures below its transition temperature for solidification, said liquid refractive element being substantially transparent to electromagnetic radiation at visible wavelengths throughout an operational temperature range of about 25° C.±20° C., said first and second rigid refractive elements being of substantially normal dispersion, said liquid being of substantially abnormal dispersion.

2. The optical system of claim 1 wherein said liquid refractive element is contained between said first and second rigid refractive elements.

3. The optical system of claim 1 wherein said liquid has a viscosity greater than 50 centistokes at 25° C.

4. The optical system of claim 1 wherein said liquid refractive element is made of a material selected from a group consisting of liquids having $\eta$-dispersion coefficients such that $\eta_1$ is less than about −0.25 and $\eta_2$ is greater than about 0.20.

5. The optical system of claim 4 wherein said liquid refractive element is made of a commercially available high-dispersion liquid of proprietary composition identified as Cargille 642134 liquid.

6. The optical system of claim 1 wherein said first and second rigid lens elements and said liquid lens element are configured and positioned with respect to each other substantially according to an optical prescription as follows:

| Surface No. | Radius (inches) | Thickness (inches) | $N_d$ | $V_d$ | Material |
| --- | --- | --- | --- | --- | --- |
| 1 | 28.3202 | 0.9000 | | | Air |
| 2 | −11.1591 | 0.0362 | 1.60311 | 0.003 | SK14 |
| 3 | −10.2791 | 0.5000 | 1.64282 | 4.570 | 642134 |
| 4 | −184.8489 | 43.1876 | 1.62588 | 0.950 | F1 |
| 5 | −18.7887 | 0.0000 | | | Air | where the surfaces of the lens elements are numbered consecutively from left to right along the optic axis, and where $N_d$ is the index of refraction at the wavelength of the sodium d spectral line and $V_d$ is the Abbe number at the same wavelength.

7. The optical system of claim 1 wherein said first and second rigid lens elements and said liquid lens element are configured and positioned with respect to each other substantially according to an optical prescription as follows:

| Surface No. | Radius (inches) | Thickness (inches) | $N_d$ | $V_d$ | Material |
| --- | --- | --- | --- | --- | --- |
| 1 | 24.6554 | 0.0000 | | | Air |
| 2 | 8.4735 | 0.5000 | 1.67270 | 0.952 | SF5 |
| 3 | 9.1706 | 0.0411 | 1.64282 | 4.570 | 642134 |
| 4 | 317.6253 | 0.8250 | 1.65160 | −0.031 | LAC7 |

-continued

| Surface No. | Radius (inches) | Thickness (inches) | $N_d$ | $V_d$ | Material |
|---|---|---|---|---|---|
| 5 | −20.8667 | 43.0722 | | | Air | where the surfaces of the lens elements are numbered consecutively from left to right along the optic axis, and where $N_d$ is the index of refraction at the wavelength of the sodium d spectral line and $V_d$ is the Abbe number at the same wavelength.

8. The optical system of claim 1 wherein said first and second rigid lens elements and said liquid lens element are configured and positioned with respect to each other substantially according to an optical prescription as follows:

| Surface No. | Radius (inches) | Thickness (inches) | $N_d$ | $V_d$ | Material |
|---|---|---|---|---|---|
| 1 | 27.0576 | 0.5000 | | | Air |
| 2 | 6.6671 | 0.0411 | 1.67270 | 0.952 | SF5 |
| 3 | 7.0385 | 0.9000 | 1.64282 | 4.570 | 642134 |
| 4 | 4312.7556 | 43.0709 | 1.67003 | 0.238 | BAF10 |
| 5 | −14.3168 | 0.0000 | | | Air | where the surfaces of the lens elements are numbered consecutively from left to right along the optic axis, and where $N_d$ is the index of refraction at the wavelength of the sodium d spectral line and $V_d$ is the Abbe number at the same wavelength.

9. The optical system of claim 1 wherein said first and second rigid lens elements and said liquid lens element are configured and positioned with respect to each other substantially according to an optical prescription as follows:

| Surface No. | Radius (inches) | Thickness (inches) | $N_d$ | $V_d$ | Material |
|---|---|---|---|---|---|
| 1 | 22.1205 | 0.5000 | | | Air |
| 2 | 7.8490 | 0.0369 | 1.64831 | 0.950 | SK12 |
| 3 | 8.3687 | 0.9000 | 1.64282 | 4.570 | 642134 |
| 4 | 212.1500 | 42.2378 | 1.62041 | −0.024 | SK16 |
| 5 | −16.5066 | 0.0000 | | | Air | where the surfaces of the lens elements are numbered consecutively from left to right along the optic axis, and where $N_d$ is the index of refraction at the wavelength of the sodium d spectral line and $V_d$ is the Abbe number at the same wavelength.

10. An optical system comprising a first rigid refractive element, a second rigid refractive element, and a liquid refractive element, said first and second rigid refractive elements and said liquid refractive element coacting with each other to provide a correction for chromatic aberration in said optical system, said liquid refractive element consisting essentially of a viscous liquid that is substantially transparent to electromagnetic radiation at visible wavelengths throughout an operational temperature range of about 25° C.±20° C., said liquid having a viscosity greater than 50 centistokes at 25° C.

11. The optical system of claim 10 wherein said viscous liquid refractive element is contained between said first and second rigid refractive elements.

12. The optical system of claim 10 wherein said viscous liquid refractive element consists of a liquid that becomes supercooled at temperatures below its transition temperature for solidification.

13. The optical system of claim 10 wherein said first and second rigid refractive elements consist of optical glass materials of substantially normal dispersion, and said viscous liquid refractive element consists of a liquid of substantially abnormal dispersion.

* * * * *